United States Patent [19]

Green

[11] Patent Number: 5,022,645
[45] Date of Patent: Jun. 11, 1991

[54] DISENGAGEABLE COUPLING USABLE IN A SHEET TRANSPORT MECHANISM

[75] Inventor: Michael H. Green, Rochester, N.Y.

[73] Assignee: Eastman Kodak Company, Rochester, N.Y.

[21] Appl. No.: 275,989

[22] Filed: Nov. 25, 1988

[51] Int. Cl.⁵ .............................................. B65H 5/02
[52] U.S. Cl. .................................... 271/276; 271/263; 271/273; 464/102; 464/103; 464/104; 403/354; 403/381
[58] Field of Search ............... 403/351, 354, 381, 382, 403/331; 464/102, 103, 104, 105; 271/263, 273, 276

[56] References Cited

U.S. PATENT DOCUMENTS

| | | | |
|---|---|---|---|
| 866,361 | 9/1907 | Hitchcock | 403/381 X |
| 1,182,904 | 5/1916 | Hamilton et al. | 464/104 |
| 1,244,533 | 10/1917 | Morse | 464/104 X |
| 1,508,085 | 9/1924 | Cooper | 464/104 X |
| 1,650,557 | 11/1927 | Weingartner | 464/104 |
| 1,791,186 | 2/1931 | Black | 403/381 X |
| 2,252,531 | 8/1941 | Tarr | 464/102 |
| 2,813,409 | 11/1957 | Wolcott | 464/102 |
| 3,454,283 | 7/1969 | Benjamin et al. | 464/103 X |
| 4,239,598 | 12/1980 | Wade | 403/381 X |
| 4,332,148 | 6/1982 | Maki et al. | 464/102 |
| 4,599,056 | 7/1986 | Crase | 403/381 X |
| 4,817,867 | 4/1989 | Schuller | 403/381 X |

FOREIGN PATENT DOCUMENTS

| | | | |
|---|---|---|---|
| 453507 | 1/1975 | U.S.S.R. | 464/102 |
| 978133 | 12/1964 | United Kingdom | 464/104 |

OTHER PUBLICATIONS

Berg. Precision Mechanical Components (1965), pp. 99-103.

Primary Examiner—Randolph A. Reese
Assistant Examiner—Franco S. DeLiguori
Attorney, Agent, or Firm—Leonard W. Treash, Jr.

[57] ABSTRACT

A disengageable coupling generally of the double slider type includes first and third components fixed to the end of shafts to be coupled. A second spider component is slidingly coupled to the first component by interlocking mating surfaces that permit limited radial sliding but prevent axial movement of the spider component. The spider component and third component have disengageable clutch surfaces which also permit radial movement of the spider component with respect to the third component.

4 Claims, 2 Drawing Sheets

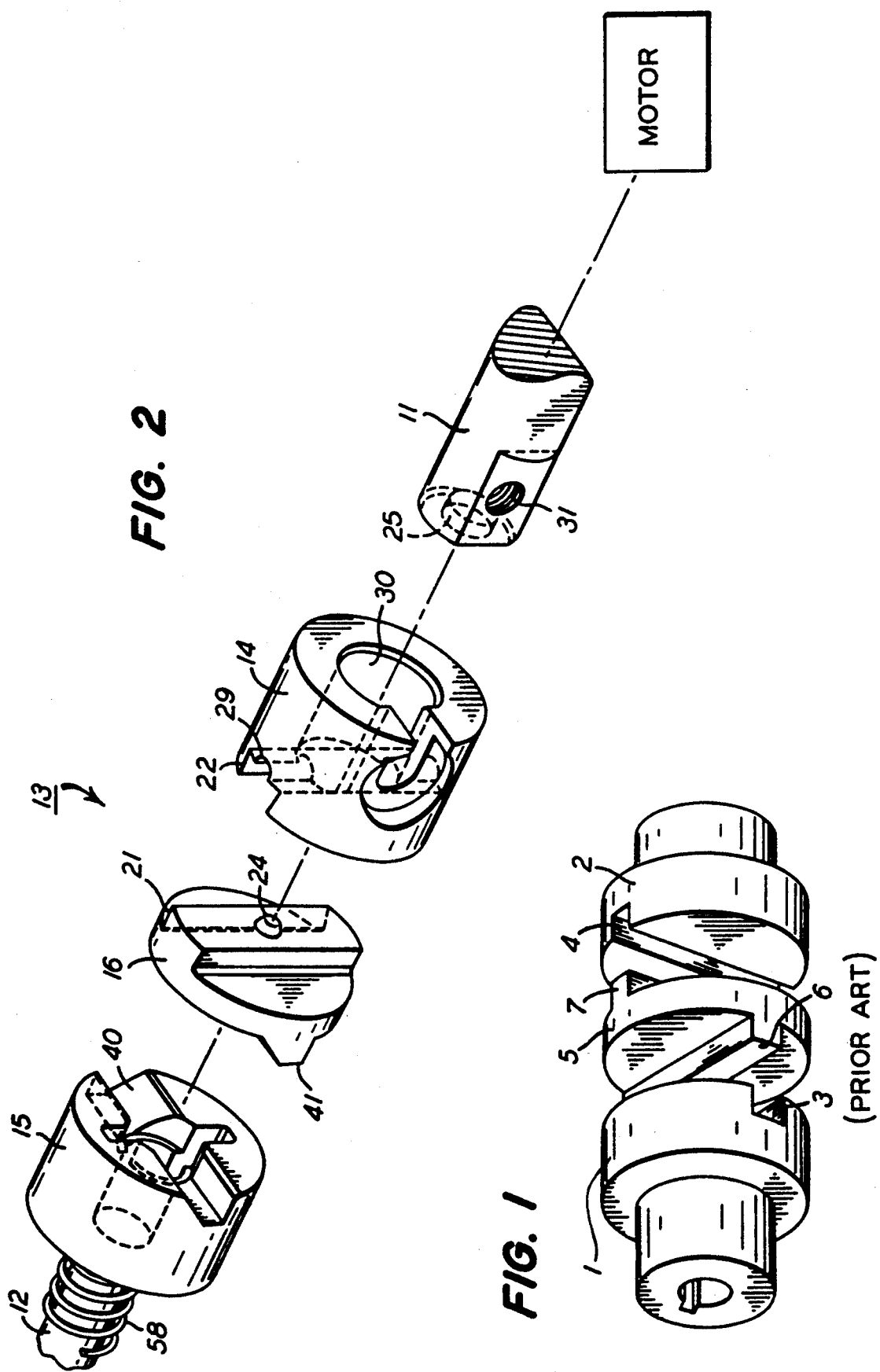

DISENGAGEABLE COUPLING USABLE IN A SHEET TRANSPORT MECHANISM

TECHNICAL FIELD

This invention relates to disengageable couplings and more specifically to a disengageable coupling generally of the type which drivingly couples first and second shafts, one of the shafts driving the other shaft through the coupling. This invention is particularly usable in a drive train for a sheet transport mechanism of a copier or printer which sheet transport mechanism is moveable to clear paper jams thereby disengaging the drive train.

BACKGROUND ART

Present electrophotographic copiers and printers are replete with paper or sheet transporting equipment which, despite the best engineering, occasionally jam. Modern day copiers, for example, have substantial software devoted toward detecting and notifying the operator that there is a jam, its location, and how to clear it. Typically, such jams are cleared by raising not only the top of the copier but the transport mechanism itself, which mechanism is pivotable to a raised position thereby separating its drive train.

Some disengageable couplings for such a drive train presently involve simple channel and projection mating surfaces. One of the driving shafts rotates until the channel and projection mate engaging the coupling. 100% alignment of the two shafts is virtually impossible, especially if jams are common and the copiers heavily used. The simple channel and projection (or pin and slot) coupling can refuse to couple with too much misalignment, or, once coupled, it can cause wobble distributed between the two shafts and generally abrupt uneven movement.

A flexible engageable coupling allows misalignment without substantial wobble, but adds substantial expense to the component.

Double slider or "Oldham" couplings are known for coupling non-disengageable shafts. Wobble is reduced or eliminated by a center component sometimes called a "spider" having mating surfaces, channels or projections, on opposite ends which are rotated 90° from each other. The mating surfaces of the spider mate with complementary surfaces on components fixed to the two shafts. Wobble is reduced or eliminated by continual radial sliding of the spider with respect to the two components fixed to the shafts. This particular coupling is not used as a disengageable coupling because the spider is held only by engagement with the other two members.

DISCLOSURE OF THE INVENTION

It is an object of the invention to provide a disengageable coupling for drivingly coupling first and second shafts, one of the shafts driving the other shaft through the coupling which coupling smoothly transmits rotary driving force despite some misalignment of the shafts.

This object is accomplished by adapting the prior art double slider or Oldham coupling to a disengageable coupling.

According to a preferred embodiment, the disengageable coupling includes three cylindrical components, a first component which is fixed to an end of a first shaft for rotation therewith, a middle, second spider component coupled to the first component and having a free end opposite said coupling, and a third component coupled to the end of the second shaft and having a free end opposite the second shaft. The third and spider components have mating surfaces associated with their free ends which when urged together will transmit rotary force from one of said surfaces to the other when said one surface is rotated in one direction with or without complete axial alignment of the surfaces. The first and middle components have coupling surfaces which prohibit axial rotary movement of the spider component with respect to the first component but permit radial sliding movement of the spider component with respect to the first component.

According to a further preferred embodiment, the coupling between the first and middle components includes interlocking channel and projection surfaces, for example, dovetailed surfaces, which permit radial sliding but prevent axial relative movement. The projection surface has a protrusion which cooperates with a recess associated with the other component to limit that radial movement and prevent separation of the first and middle components when the coupling is disengaged. For ease in assembly, the recess is preferably in the end of the first shaft.

BRIEF DESCRIPTION OF THE DRAWINGS

FIG. 1 is a perspective view of a typical double slider coupling constructed according to the prior art.

FIG. 2 is a perspective view of a disengageable coupling constructed according to the invention.

BEST MODE OF CARRYING OUT THE INVENTION

Figure 3:
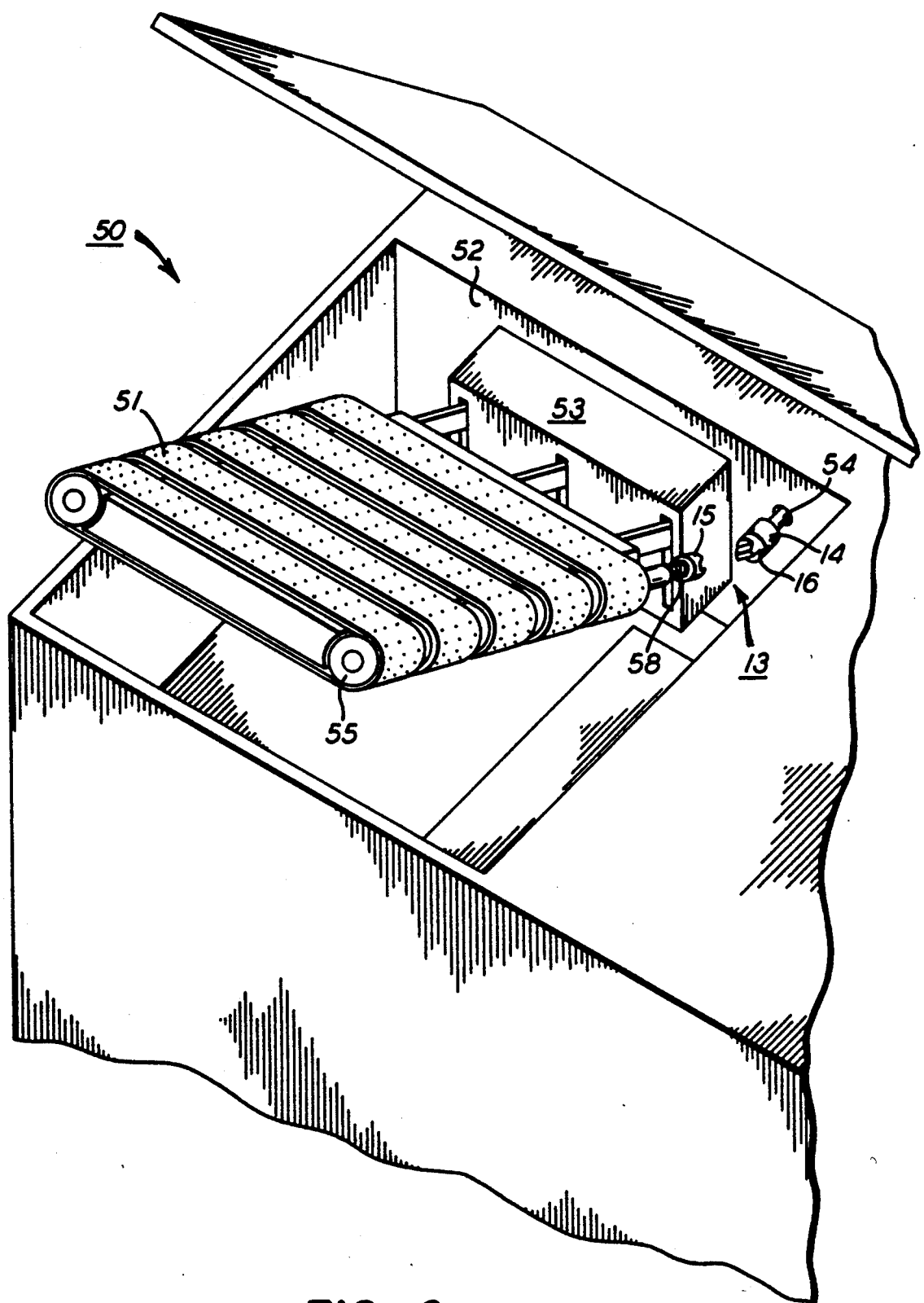
FIG. 3 is a perspective view of a portion of a copier or printer illustrating a use for the invention as shown in FIG. 2.

According to FIG. 1 a prior art double slider coupling includes first and third cylindrical components 1 and 2 each of which are fixed to their respective shafts, not shown. Both components contain slot or channel mating surfaces, for example, channels or slots 3 and 4. A second, middle or spider component 5 has projection mating surfaces 6 and 7 on each end which fit in the channels 3 and 4. The first and second components are urged together by the general construction of the drive shafts holding the spider between them. Any misalignment of the shafts is smoothed by a small amount of continual movement of the spider within the channels 3 and 4.

Referring to FIG. 2 the principles of the prior double slider coupling are applied to a disengageable coupling. First and second shafts 11 and 12 are coupled by a disengageable coupling 13 which includes a cylindrical first component 14 which is fixed to the end of the first shaft 11 and a cylindrical third component 15 which is fixed to the end of the second shaft 12. A middle, second spider component 16 slidingly moves between the first and third components reducing the wobble and providing a smoother transition of force as in prior Oldham couplings.

To permit disengagement of the shafts 11 and 12 and therefore the first and third components 14 and 15 the spider 16 is slidingly coupled to the first component by coupling surfaces which prohibit axial and rotary motion of the spider component with respect to the first component but permit limited radial sliding movement of the spider 16 with respect to the first component 14. More specifically, interlocking mating surfaces, for example, a dovetailed projection 21 on the spider fits in a complementary mating surface, for example, dovetailed slot 22 on the first component. The angle of the dovetailed side surfaces of surfaces 21 and 22 prohibit axial movement of the spider away from the first component 14. Alternatively, projection 21 could have side surfaces parallel to the axis as in the prior art, but have lips which mate with subchannels in channel 22 to similarly slidingly interlock projection 21 with channel 22.

To prohibit the spider from sliding radially out of receiving channel 22 when the mating surfaces 21 and 22 are vertically oriented (and the coupling is disengaged), a protrusion 24 on mating surface 21 fits into an axial recess 25 in the end of the first shaft 11. Recess 25 is several times the size of protrusion 24. This permits substantial sliding movement of spider 16 radially with respect to first component 14. However, that movement is limited by the edges of the recess 25 thereby preventing the loss of spider 16 by having it become completely disconnected from first component 14. In assembly, the first shaft 11 is placed in a bore 30 in first component 14. A screw hole 31 receives a set screw to hold the shaft in place and fix the first component with respect to the first shaft 11. The location of the first shaft 11 with respect to the first component 14 correctly positions the recess 25 with respect to the protrusion 24 which is already in place. The bottom of channel 22 has an additional subchannel 29 to permit passing of protrusion 24 as projection 21 slides in place in channel 22.

The third component 15 and spider 16 have mating surfaces including one-way rotary drive or clutch surface 40 on third component 15 and a complementary clutch drive surface 41 on spider 16. In operation, a motor is connected to and drives first shaft 11 in a counterclockwise direction as seen from the right in FIG. 2. Clutch or mating surface 41 has surfaces generally parallel to the shaft axis which mate with complementary surfaces on the clutch surfaces 40 on third component 15 to drive third component 15 in a similarly counterclockwise direction, thereby transmitting force to second shaft 12. Third component 15 is spring urged by compression spring 58 toward first shaft 11 with respect to second shaft 12 so that as second shaft 12 is brought toward engagement with first shaft 11 the third component 15 will be urged against spider 16 and clutch surfaces 40 and 41 will engage.

Spider component 16 is able to slidingly move the extent of the recess 25 in a vertical path as shown in FIG. 2 and to the full extend of the coupling in the horizontal direction of the clutch surfaces 40 and 41. This permitted motion of the spider 16 provides a smooth and generally wobble-free transmission of force between the two shafts as in the double slider coupling described according to prior art in FIG. 1.

The particular application for which this disengageable coupling was designed is a sheet transport mechanism for a copier or printer shown in FIG. 3. More specifically, a copier or printer 50 includes a vacuum transport mechanism 51 which is hinged to a mainframe 52 of the apparatus by a hinge 53. The hinge 53 allows the transport mechanism 51 to be raised for clearing of jams of paper transmitted beneath it. This raising of the transport mechanism causes a drive shaft 54 to be disengaged from a drive roller 55 forming part of the drive train for the transport mechanism 51. The disengageable coupling 13 described with respect to FIG. 2 is schematically shown in FIG. 3. With this coupling the transport mechanism 51 can be lowered into place mating the third component 15 with the spider component 16 as explained with respect to FIG. 2. The compression spring 58 is positioned between the roller 55 and the third component 15 and urges the third component 15 toward engagement with spider component 16.

The invention has been described in detail with particular reference to a preferred embodiment thereof, but it will be understood that variations and modifications can be effected within the spirit and scope of the invention as described hereinabove and as defined in the appended claims.

I claim:

1. A disengageable coupling, for drivingly coupling first and second shafts which shafts are totally separable, one of the shafts which shafts are totally separable, one of the shafts driving the other shaft through said coupling, said coupling comprising:

a cylindrical first component fixed to an end of said first shaft for rotation therewith, a cylindrical second component coupled to said first component and having a free end opposite said first component, a cylindrical third component rotationally fixed to the end of the second shaft and having a free end facing said second component, said second and third components having mating clutch surfaces associated with their free ends which surfaces are totally disengageable solely by relative axial movement of said shafts, and when engaged will transmit rotary force from one of said shafts to the other but which will permit some radial sliding movement of said second component with respect to said third component, and said first and second components having coupling surfaces which include a projection on one surface and a complementary channel in the other surface which projection and channel include complementary interlocking surfaces which prohibit axial and rotary motion of said second component with respect to said first component, but permit limited radial movement of said second component with respect to said first component.

2. The coupling according to claim 1 wherein said projection is on said second component and includes an axially placed protrusion, said channel is on said first component, a recess associated with said channel is positioned to receive said protrusion and permit radial movement of said second component with respect to said first component, the edges of said recess restricting such radial movement within a range that prevents uncoupling of said second component from said first component.

3. The coupling according to claim 2 wherein said recess is located in an end surface of said first shaft, which is positioned in a bore in the first component.

4. A copier or printer comprising: a sheet transport mechanism which is pivotable to clear jams, said sheet transport mechanism including a drive train having first and second aligned shafts, one of said shafts being pivotable away from the other shaft with said transport mechanism, and a disengageable coupling for engaging said first and second shafts when said transport mechanism is not so pivoted, said disengageable coupling including a cylindrical first component fixed to an end of said first shaft for rotation therewith, a cylindrical second component coupled to said first component and having a free end opposite said first component, a cylindrical third component rotationally fixed to the end of the second shaft and having a free end facing said second component, said second and third components having mating clutch surfaces associated with their free ends which surfaces are totally disengageable by relative axial movement of said shafts, and when engaged will transmit rotary force from one of said shafts to the other but which will permit some radial sliding movement of said second component with respect to said third component, and said first and second components having coupling surfaces which include a projection on one surface and a complementary channel in the other surface which projection and channel include complementary interlocking surfaces which prohibit axial and rotary motion of said second component with respect to said first component, but which permit limited radial movement of said second component with respect to said first component.

* * * * *

UNITED STATES PATENT AND TRADEMARK OFFICE
CERTIFICATE OF CORRECTION

PATENT NO. : 5,022,645

DATED : June 11, 1991

INVENTOR(S) : Michael H. Green

It is certified that error appears in the above-identified patent and that said Letters Patent is hereby corrected as shown below:

Col. 4, claim 1, lines 15-16, after "shafts" delete --which shafts are totally separatable, one of the shafts--.

Signed and Sealed this

Twenty-seventh Day of October, 1992

Attest:

DOUGLAS B. COMER

*Attesting Officer*      *Acting Commissioner of Patents and Trademarks*